US010961365B2

United States Patent
Ponticiello et al.

(10) Patent No.: US 10,961,365 B2
(45) Date of Patent: Mar. 30, 2021

(54) COMPOSITIONS OF EXPANDABLE VINYL AROMATIC POLYMERS WITH AN IMPROVED THERMAL INSULATION CAPACITY, PROCESS FOR THEIR PRODUCTION AND EXPANDED ARTICLES OBTAINED THEREFROM

(71) Applicant: Versalis S.p.A., San Donato Milanese (IT)

(72) Inventors: Antonio Ponticiello, Mozzecane (IT); Dario Ghidoni, Gonzaga (IT); Riccardo Felisari, San Giorgio di Mantova (IT)

(73) Assignee: Versalis S.p.A., San Donato Milanese (IT)

( * ) Notice: Subject to any disclaimer, the term of this patent is extended or adjusted under 35 U.S.C. 154(b) by 218 days.

(21) Appl. No.: 15/996,683

(22) Filed: Jun. 4, 2018

(65) Prior Publication Data
US 2018/0273717 A1    Sep. 27, 2018

Related U.S. Application Data

(63) Continuation of application No. 13/140,500, filed as application No. PCT/EP2009/009110 on Dec. 16, 2009, now abandoned.

(30) Foreign Application Priority Data

Dec. 19, 2008 (IT) .......................... MI2008A002278

(51) Int. Cl.
  *C08J 9/00*    (2006.01)

(52) U.S. Cl.
  CPC ......... *C08J 9/0066* (2013.01); *C08J 2325/04* (2013.01)

(58) Field of Classification Search
  CPC .......................... C08J 9/0066; C08J 2325/04
  See application file for complete search history.

(56) References Cited

U.S. PATENT DOCUMENTS

| | | | | |
|---|---|---|---|---|
| 6,130,265 A * | 10/2000 | Glueck | .................... | C08F 12/08 521/56 |
| 6,340,713 B1 * | 1/2002 | Gluck | .................... | C04B 16/08 521/146 |
| 6,362,242 B1 * | 3/2002 | Gluck | .................... | C08J 9/16 521/146 |
| 6,384,094 B1 | 5/2002 | Glueck | | |
| 6,444,714 B1 | 9/2002 | Glueck et al. | | |
| 6,455,599 B1 * | 9/2002 | Berghmans | ................ | C08J 9/22 521/58 |
| 7,612,119 B2 | 11/2009 | Ponticiello et al. | | |
| 2008/0234400 A1 * | 9/2008 | Allmendinger | ......... | C04B 16/08 521/57 |
| 2008/0248272 A1 | 10/2008 | Felisari et al. | | |
| 2009/0068354 A1 | 3/2009 | Ghidoni et al. | | |
| 2011/0046249 A1 | 2/2011 | Ponticiello et al. | | |

FOREIGN PATENT DOCUMENTS

| | | | |
|---|---|---|---|
| DE | 198 43 327 | 3/2000 | |
| SU | 992542 | 1/1983 | |
| WO | 00 06635 | 2/2000 | |
| WO | 2006 058733 | 6/2006 | |
| WO | 2006 108672 | 10/2006 | |
| WO | WO-2007023091 A1 * | 3/2007 | ............. C04B 16/08 |
| WO | 2008 061678 | 5/2008 | |

OTHER PUBLICATIONS

Asbury Carbons—The World's Carbon and Graphite Source—Cokes, Mar. 7, 2008.*
Opposition Documents in EP 2 358 798 B1 (issued Feb. 11, 2015).
Opposition Documents in EP 2 358 798 B1 (Dated Jun. 24, 2016).
Opposition Documents in EP 2 358 798 B1 (Dated Mar. 21, 2017).
Opposition Documents in EP 2 358 798 B1 (Dated Mar. 23, 2017).
Opposition Documents in EP 2 358 798 B1 (Dated Dec. 23, 2017).
Opposition Documents in EP 2 358 798 B1 (Dated Apr. 6, 2018).
Wachtler, M., et al., "The behavior of graphite, carbon black, and $Li_4Ti_5O_{12}$ in LIBOB-based electrolytes," Journal of Applied Electrochemistry, vol. 36, pp. 1199-1206, (2006).
International Search Report dated Mar. 5, 2010 in PCT/EP09/009110 filed Dec. 16, 2009.

* cited by examiner

*Primary Examiner* — Irina S Zemel
(74) *Attorney, Agent, or Firm* — Oblon, McClelland, Maier & Neustadt, L.L.P.

(57) ABSTRACT

Expandable vinyl aromatic polymers comprising:
  a matrix obtained by polymerizing 50-100% by weight of one or more vinyl aromatic monomers and 0-50% by weight of at least one co-polymerizable monomer;
  1-10% by weight, calculated with respect to polymer (a), of an expanding agent embedded in the polymeric matrix;
  0-25% by weight, calculated with respect to polymer (a), of a filler comprising carbon coke having an average diameter of between 0.5 and 100 µm, with a surface area, measured according to ASTM D-3037/89, ranging from 5 to 200 $m^2/g$;
  0.05-10% by weight, calculated with respect to polymer (a), of expanded graphite in particle form, with a particle average diameter (size) ranging from 1 to 30 µm, a surface area, measured according to ASTM D-3037/89, ranging from 5 to 500 $m^2/g$ and a density ranging from 1.5 to 5 $g/cm^3$.

18 Claims, No Drawings

COMPOSITIONS OF EXPANDABLE VINYL AROMATIC POLYMERS WITH AN IMPROVED THERMAL INSULATION CAPACITY, PROCESS FOR THEIR PRODUCTION AND EXPANDED ARTICLES OBTAINED THEREFROM

REFERENCE TO PRIOR APPLICATIONS

This application is a Continuation of U.S. application Ser. No. 13/140,500, filed Aug. 12, 2011, ; which is a 371 of PCT/EP2009/009110, filed Dec. 16, 2009. Priority to Italian Patent Applicaton No. MI2008A 002278, filed Dec. 19, 2008, is claimed.

The present invention relates to compositions of expandable vinyl aromatic polymers with an improved thermal insulation capacity, the process for their preparation and the expanded articles obtained therefrom.

More specifically, the present invention relates to granules based on expandable vinyl aromatic polymers, for example expandable polymers of styrene, which, after expansion, have a reduced thermal conductivity even with a low density, lower than 20 g/l, for example, and the expanded products obtained from the same, i.e. the extruded expanded sheets obtained starting from said vinyl aromatic compositions.

Expandable vinyl aromatic polymers and, in particular, expandable polystyrene (EPS), are known products, long used for preparing expanded articles which can be adopted in various applicative areas, among which, one of the most important is thermal insulation.

These expanded products are obtained by first swelling the polymer granules, in a closed environment, impregnated with an expandable fluid, for example an aliphatic hydrocarbon such as pentane or hexane, and then molding the swollen particles contained inside a mould, by means of the contemporaneous effect of pressure and temperature. The swelling of the particles is generally effected with vapour, or another gas, maintained at a temperature slightly higher than the glass transition temperature (Tg) of the polymer.

A particular applicative field of expanded polystyrene is that of thermal insulation in the building industry where it is generally used in the form of flat sheets. The flat expanded polystyrene sheets are normally used with a density of about 30 g/l as the thermal conductivity of the polymer has a minimum at these values.

It is not advantageous to fall below this limit, even if it is technically possible, as it causes a drastic increase in the thermal conductivity of the sheet which must be compensated by an increase in its thickness. In order to avoid this drawback, suggestions have been made to fill the polymer with athermanous materials such as graphite, carbon black or aluminium. Athermanous materials are in fact capable of interacting with the radioactive flow, reducing its transmission and thus increasing the thermal insulation of the expanded materials in which they are contained.

European patent 620,246, for example, describes a process for preparing beads of expandable polystyrene containing an athermanous material distributed on the surface or, as an alternative, incorporated inside the particle itself.

International patent application WO 1997/45477 describes compositions based on expandable polystyrene comprising a styrene polymer, from 0.05 to 25% of carbon black of the lamp black type, and from 0.6 to 5% of a brominated additive to make the product fireproof.

Japanese patent application JP 63183941 describes the use of graphite for improving the insulating capacity of polystyrene foams.

Patent application JP 60031536 describes the use of carbon black in the preparation of expandable polystyrene resins.

International patent application WO 2006/61571 describes compositions based on expandable polystyrene comprising a styrene polymer having a weight average molecular weight Mw of 150,000-450,000, from 2 to 20% by weight of an expanding agent and from 0.05 to less than 1% of carbon black, with a surface area ranging from 550 to 1,600 $m^2/g$.

The use is also known, for example from U.S. Pat. No. 6,444,714, of expanded graphite as flame retardant additive for expandable styrene polymers. The moulded articles made of expanded polystyrene obtained from expandable polystyrene granules/beads containing expanded graphite, alone, or possibly mixed with phosphorous derivatives, are capable of only satisfying the requirements of the flame-retardant classifications B1 and B2 of the DIN 4102 regulations.

The Applicant has now found that it is possible to prepare a composition based on expandable vinyl aromatic polymers with enhanced thermo-insulation properties, using as athermanous additive, a mixture which has never been described in literature, comprising carbon coke and expanded graphite. It has been found, in fact, that, when used in combination with carbon coke, the expanded graphite not only allows the concentration of the traditional flame-retardant agents, such as halogen derivatives, to be reduced, but also exerts (together with coke) a completely unexpected action of athermanous agent.

An object of the present invention therefore relates to compositions of expandable vinyl aromatic polymers, for example in the form of granules or beads, comprising:
a) a matrix produced by polymerizing a base comprising 50-100% by weight of one or more vinyl aromatic monomers and 0-50% by weight of at least one co-polymerizable monomer;
b) 1-10% by weight, calculated with respect to polymer (a), of an expanding agent embedded in the polymeric matrix; and an athermanous filler comprising:
c) 0-25% by weight, preferably 0.05-25%, more preferably 0.5-10%, calculated with respect to polymer (a), of carbon coke in particle form, having an average diameter ($d_{50}$) of the particles (size) of between 0.5 and 100 µm, preferably from 2 to 20 µm, and a surface area, measured according to ASTM D-3037/89 (BET), ranging from 5 to 200 $m^2/g$, preferably from 8 to 50 $m^2/g$; and
d) 0.05-10% by weight, preferably 0.5-5%, calculated with respect to polymer (a), of expanded graphite in particle form, with a particle average diameter (size) ranging from 1 to 30 µm, preferably from 2 to 10 µm and a surface area, measured according to ASTM D-3037/89 (BET), ranging from 5 to 500 $m^2/g$, preferably form 8 to 50 $m^2/g$ and a density of 1.5 to 5 $g/cm^3$.

The polymeric composition object of the present invention can be obtained, as better illustrated hereunder, by means of:
1. a process in suspension, which comprises the dissolution/dispersion of the athermanous filler and possible additives in the monomer, followed by the polymerization in aqueous suspension and addition of the expanding agent; or
2. a continuous mass process which includes the following steps, in series:

mixing a vinyl aromatic polymer in the form of granules or powder or already in the molten state, with an athermanous filler (as such or in the form of master-batch) and other possible additives;

possibly, if not already in the molten state, heating the polymeric mixture to a temperature higher than the melting point of the vinyl aromatic polymer;

incorporating the expanding agent in the molten polymer, together with other possible additives, such as the flame-retardant systems described hereunder;

mixing the polymeric composition thus obtained by means of static or dynamic mixing elements;

the polymeric composition thus obtained can be sent to a cutting die under pressure (for example according to the procedures described in U.S. Pat. No. 7,320,585); or 3. a direct extrusion process, i.e. feeding a mixture of granules or powder of vinyl aromatic polymer and athermanous filler (as such, or in master-batch form), directly to an extruder, into which the expanding agent is also fed.

The carbon coke (or, simply, coke) is available as a fine powder with a particle size (MT50) ranging from 0.5 to 100 μm, preferably from 2 to 20 μm. The particle size (MT50 or, equivalently, $d_{50}$) is measured by means of a laser particle-size analyzer and is the value of the diameter corresponding to 50% by weight of particles having a smaller diameter and 50% by weight having a higher diameter value. Diameter means the size of the particle measured with a laser particle-size analyzer as described above.

The coke is produced by the pyrolysis of organic material and at least partly passes through a liquid or liquid-crystalline state during the carbonization process. The starting organic material is preferably petroleum, coal or lignite.

The coke used in the preparation of the polymeric compositions in granules, object of the present invention, is more preferably the carbonization product of the fraction of high-boiling hydrocarbons coming from the distillation of petroleum, conventionally known as the heavy residual fraction. In particular, the coke is obtained starting from the coking of the heavy residual fraction, an operation carried out at high temperature which again produces some light fractions and a solid (petroleum coke). The petroleum coke thus obtained is calcined at a temperature ranging from 1,000 to 1,600° C. (calcined coke).

If a heavy residual fraction rich in aromatic components is used, a coke is produced after calcination at 1,800-2,200° C. with a crystalline needle structure (needle coke).

More information on coke, the production methods and characterization of the various grades commercially available (green coke, coal-derived pitch coke, delayed coke, fluid coke, needle coke, premium coke, calcined coke, shot, spange, etc.) is available online, in the website goldbook.iupuac.org or in Pure Appl. Chem., 1995, vol. 67, Nr. 3, pages 473-506 "Recommended terminology for the description of carbon as a solid (IUPAC Recommendations 1995)".

Expanded graphite is a product available on the market, its preparation is known to experts in the field. More detailed information on expanded graphite can be found in the network on the site of the company Nyacol Nano Technologies Inc. (www.nyacol.com/ under the item "White Papers/Abstracts").

When the coke concentration is equal to zero, the expanded graphite has a particle size ranging from 1 to 15 (14.99) μm, preferably from 2 to 10 μm.

According to the present invention, said athermanous filler, coke and expanded graphite added to the vinyl aromatic polymer, can include up to 5% by weight, calculate with respect to polymer (a), of carbon black with an average particle size ($d_{50}$) of between 10 and 500 nm and a surface area ranging from 5 and 40 m²/g.

The term "vinyl aromatic monomer", as used in the present description and claims, essentially means a product corresponding to the following general formula:

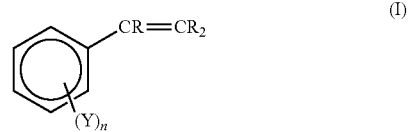

wherein R is a hydrogen or a methyl group, n is zero or an integer ranging from 1 to 5 and Y is a halogen, such as chlorine or bromine, or an alkyl or alkoxyl radical having 1 to 4 carbon atoms.

Examples of vinyl aromatic monomers having the general formula identified above, are:

styrene, α-methylstyrene, methylstyrene, ethylstyrene, butylstyrene, dimethylstyrene, mono-, di-, tri-, tetra- and penta-chlorostyrene, bromo-styrene, methoxystyrene, acetoxystyrene, etc. Preferred vinyl aromatic polymers are styrene and α-methylstyrene.

The vinyl aromatic monomers corresponding to general formula (I) can be used alone or in a mixture up to 50% by weight with other co-polymerizable monomers. Examples of said monomers are (meth)acrylic acid, $C_1$-$C_4$ alkyl esters of (meth)acrylic acid such as methyl acrylate, methyl methacrylate, ethyl acrylate, ethyl methacrylate, isopropyl acrylate, butyl acrylate, amides and nitriles of (meth)acrylic acid such as acrylamide, methacrylamide, acrylonitrile, methacrylonitrile, butadiene, ethylene, divinyl benzene, maleic anhydride, etc. Preferred co-polymerizable monomers are acrylonitrile, methyl methacrylate.

Any expanding agent capable of being embedded in the polymeric vinyl aromatic matrix can be used in combination with the expandable polymers object of the present invention. Typical examples are aliphatic hydrocarbons, Freon, carbon dioxide, alcohols such as ethyl alcohol, water, etc.

The athermanous filler including coke and expanded graphite can be added to the vinyl aromatic polymer by means of suspension or re-suspension polymerization, by means of the continuous mass technology or through direct extrusion, so that its final total concentration in the polymer ranges from 0.1 to 35% by weight, preferably from 1 to 15%.

Conventional additives, generally used with traditional materials, such as pigments, stabilizing agents, nucleating agents, flame-retardant systems, antistatic agents, release agents, etc., can be added to the compositions of expandable polymers, object of the present invention. In particular, a flame-retardant system can be added to the present composition, comprising from 0.1 to 8%, with respect to the polymer (a), of a self-extinguishing brominated additive containing, for example, at least 30% by weight of bromine and from 0.05 to 2% by weight, again with respect to the polymer (a), of a synergic product containing at least one C—C or O—O labile bond, as described hereunder.

At the end of the addition of the athermanous filler, the expanding agent and possible additives, an expandable polymer is obtained in granules, which can be transformed to produce expanded articles having a density ranging from 5 to 50 g/l, preferably from 10 to 25 g/l. For direct extrusion, on the other hand, densities of 20 to 40 g/l are used.

These expanded articles have an excellent heat insulation capacity, expressed by a thermal conductivity ranging from 25 to 50 mW/mK, preferably from 30 to 45 mW/mK, which is generally even more than 10% lower with respect to that of equivalent expanded materials without fillers currently on the market, for example EXTIR A-5000 of Polimeri Europa SpA.

Thanks to these characteristics of the expandable polymers object of the present invention, it is possible to prepare heat-insulating articles with a significant saving of material or, for example, to prepare sheets with a lesser thickness than those prepared with traditional non-filled polymers, with a consequent saving in space and product.

Included in the definition of expanded articles are expanded extruded sheets of vinyl aromatic polymers comprising a cellular matrix of a vinyl aromatic polymer, for example polystyrene, having a density ranging from 10 to 200 g/l, an average cell dimension ranging from 0.01 to 1.00 mm and containing from 0.1 to 35% by weight, calculated with respect to the polymer, preferably from 1 to 15%, of said athermanous filler comprising said coke in particle form with an average particle diameter ($d_{50}$) ranging from 0.5 to 100 μm, preferably from 2 to 20 μm, and a surface area, measured according to ASTM D-3037-89 (BET), ranging from 5 to 200 $m^2$/g, preferably from 8 to 50 $m^2$/g and said expanded graphite in particle form with an average particle diameter ($d_{50}$) (size) ranging from 1 to 30 μm, preferably from 2 to 10 μm, and a surface area, measured according to ASTM D-3037-89 (BET), ranging from 5 to 500 $m^2$/g, preferably from 8 to 50 $m^2$/g, and a density preferably ranging from 1.5 to 5 g/$cm^3$.

The athermanous filler of coke and expanded graphite, added to the vinyl aromatic polymer of the expanded extruded sheet, can comprise up to 5% by weight, calculated with respect to the polymer, for example from 0.01 to 5% by weight, preferably from 0.05 to 4.5% respectively of carbon black, as described above.

Conventional additives normally used with traditional materials, such as pigments, stabilizers, nucleating agents, flame-retardant systems as described above, antistatic agents, release agents, etc., can also be added to said expanded extruded sheets.

A further object of the present invention relates to processes for the preparation of compositions based on expandable vinyl aromatic polymers, for example in beads or granules, having a reduced thermal conductivity and a density, after expansion, lower than 50 g/l.

In particular, a further object of the present invention relates to a process for preparing expandable vinyl aromatic polymers, in beads or granules, indicated above, which comprises the polymerization in an aqueous suspension of one or more vinyl aromatic monomers, possibly together with at least one polymerizable comonomer in quantities up to 50% by weight, in the presence of an athermanous filler comprising said coke in particle form with an average particle diameter ($d_{50}$) (size) ranging from 0.5 to 100 μm, preferably from 2 to 20 μm, and a surface area ranging from 5 to 200 $m^2$/g, preferably from 8 to 50 $m^2$/g, having the above-mentioned characteristics, and said expanded graphite in particle form with an average particle diameter ($d_{50}$) (size) ranging from 1 to 30 m, preferably from 2 to 10 μm, and a surface area ranging from 5 to 500 $m^2$/g, preferably from 8 to 50 $m^2$/g, and a density preferably ranging from 1.5 to 5 g/$cm^3$ and at least in the presence of a peroxide radical initiator and an expanding agent added before, during or at the end of the polymerization.

The athermanous filler can also comprise up to 5% by weight, calculated with respect to the polymer, for example from 0.01 to 5% by weight, preferably from 0.05 to 4.5%, of carbon black. The carbon black can have a particle size ($d_{50}$) of 10 to 500 nm, with a surface area of 5-40 $m^2$/g.

The polymerization is carried out in an aqueous suspension with inorganic salts of phosphoric acid, for example, tri-calcium phosphate or magnesium phosphate.

These salts can be added to the polymerization mixture either already finely subdivided or synthesized in situ by reaction, for example, between sodium pyrophosphate and magnesium sulphate.

Said inorganic salts are assisted in their suspending action by anionic surface-active agents, for example sodium dodecylbenzene sulfonate or their precursors such as sodium metabisulfite, as described in U.S. Pat. No. 3,631,014.

The polymerization can also be carried out in the presence of organic suspending agents such as polyvinylpyrrolidone, polyvinyl alcohol, etc.

The initiating system normally comprises two peroxides, the first with a halving time of an hour at 85-95° C. and the other with a halving time of an hour at 110-120° C. Examples of these initiators are tert-butylperoxy-2-ethyl-hexanoate and tert-butylperbenzoate.

The vinyl aromatic polymer or copolymer which is obtained has an average molecular weight Mw ranging from 50,000 to 250,000, preferably from 70,000 to 200,000. In general, more details on procedures for the preparation of expandable vinyl aromatic polymers in aqueous solution or, more generally, polymerization in suspension, can be found in Journal of Macromolecular Science, Review in Macromolecular Chemistry and Physics C31 (263) 215-299 (1991).

To improve the stability of the suspension, it is possible to increase the viscosity of the reagent solution of vinyl aromatic monomers, to be suspended in water, by dissolving vinyl aromatic polymer therein, up to a concentration of 1 to 30% by weight, preferably from 5 to 20%, calculated with respect to the monomers. The solution can be obtained by dissolving a preformed polymer in the reagent mixture (for example fresh polymer or waste-products from previous polymerizations and/or expansions) or by a mass pre-polymerization of the monomer, or blend of monomers, until the previously mentioned concentrations are obtained, and subsequently continuing the polymerization in aqueous suspension in the presence of the remaining additives.

During the polymerization in suspension, polymerization additives are used, according to methods well-known to experts in the field, which are typically those for producing expandable vinyl aromatic polymers, such as stabilizing agents of the suspension, chain-transfer agents, expansion co-adjuvants, nucleating agents, plasticizers, etc. In particular, during the polymerization, it is preferable to add an anti-flame system comprising flame-retardants, in a quantity ranging from 0.1 to 8% and synergic products in quantities ranging from 0.05 to 2% with respect to the resulting weight of the polymer.

Flame-retardants particularly suitable for the expandable vinyl aromatic polymers object of the present invention are aliphatic, cyclo-aliphatic compounds, brominated aromatic compounds, such as hexabromocyclododecane, pentabromomonochlorocyclohexane and pentabromophenyl allyl ether, tetrabromobisphenol-A allyl ether. Said flame-retardants can be thermally stabilized. For this purpose organostannic additives can be advantageously used, such as, for example, tin dibutyl dimaleate or tin dioctyl laurate, or substances capable of blocking the free bromine such as, for example, hydrotalcite, derivatives of hydrotalcite (Baerostab LUC of Baerlocher), organic molecules containing epoxy groups, for example F2200HM sold be Eurobrom.

Synergic products which can be used are dicumyl peroxide, cumene hydroperoxide, 3,4-dimethyl-3,4-diphenyl-hexane, 3,4-dimethyl-3,4-diphenyl butane, 3,6,9-triethyl-3,6,9-trimethyl-1,4,7-triperoxyinonane.

The expanding agents are preferably added during the polymerization phase, or subsequently by means of the re-suspension technology. In particular, the latter comprises the phases of:

polymerizing in aqueous suspension one or more vinyl aromatic monomers at least in the presence of the athermanous filler comprising coke and expanded graphite;
separating the beads or granules thus obtained;
re-suspending the beads or granules in water and heating until their spherical form is obtained;
adding the expanding agents to the suspension and keeping the beads in contact with the same until impregnation; and
re-separating the beads.

The expanding agents are selected from aliphatic or cyclo-aliphatic hydrocarbons containing from 3 to 6 carbon atoms such as n-pentane, iso-pentane, cyclopentane or blends thereof; halogenated derivatives of aliphatic hydrocarbons containing from 1 to 3 carbon atoms, such as, for example, dichlorodifluoromethane, 1,2,2-trifluoroethane, 1,1,2-trifluoroethane; carbon dioxide; water; and ethyl alcohol.

At the end of the polymerization, whether it be in suspension or resuspension, substantially spherical beads/granules of expandable polymer are obtained, with an average diameter ranging from 0.2 to 3 mm, preferably from 1 to 1.5 mm, in which said athermanous filler, comprising coke and expanded graphite, and said other possible additives, are homogeneously dispersed.

The granules are then discharged from the polymerization reactor and washed, in continuous or batchwise, with non-ionic surface-active agents or, alternatively, with acids, as described in U.S. Pat. No. 5,041,465. The polymer granules can be subsequently treated thermally with hot air ranging from 30 to 60° C.

A further object of the present invention relates to a process for preparing in continuous mass, compositions based on expandable vinyl aromatic polymers, in beads or granules, which comprises the following steps in series:

i. mixing a vinyl aromatic polymer in granular or powder form or already in the molten state, with an average molecular weight Mw ranging from 50,000 to 250,000, preferably from 70,000 to 200,000, with said athermanous filler comprising said coke in particle form, with an average particle diameter ($d_{50}$) ranging from 0.5 to 100 µm, preferably from 2 to 20 m, and a surface area ranging from 5 to 200 $m^2/g$, preferably from 8 to 50 $m^2/g$, having the above-mentioned characteristics, and said expanded graphite in particle form with an average particle diameter ($d_{50}$) (size) ranging from 1 to 30 µm, preferably from 2 to 10 µm, and a surface area ranging from 5 to 500 $m^2/g$, preferably from 8 to 50 $m^2/g$, and a density preferably ranging from 1.5 to 5 $g/cm^3$.

The athermanous filler can also comprise up to 5% by weight, calculated with respect to the polymer, for example from 0.01 to 5% by weight, preferably from 0.05 to 4.5%, of carbon black. The carbon black can have an average particle size ($d_{50}$) ranging from 10 to 500 nm and a surface area ranging from 5 to 40 $m^2/g$.

Other possible additives, already described, among which pigments, stabilizers, nucleating agents, said flame-retardant systems, antistatic agents, release agents, etc. can also be added in this step either totally or partially;

ii. optionally, if not already in the molten state, bringing the polymeric mixture to a temperature higher than the melting point of the vinyl aromatic polymer;

iii. incorporating said expanding agent and possibly a part or all of said other additives in the molten polymer;

iv. mixing the polymeric composition thus obtained by means of static or dynamic mixing elements; and v. granulating the composition thus obtained in a device which comprises a die, a cutting chamber and a cutting system.

At the end of the granulation, beads/granules of expandable polymer can be obtained with a substantially spherical form having an average diameter ranging from 0.2 to 3 mm, preferably from 1 to 1.5 mm.

According to the present invention, step (i) can be effected by feeding the polymeric granule already formed, possibly mixed with processing waste products, in an extruder. The single components of the composition, object of the present invention, are mixed therein and the polymeric portion is subsequently melted and an expanding agent and other possible additives are then added.

Alternatively, the polymer can be used already in the molten state, coming directly from the polymerization plant in solution, in particular from the relative devolatilization unit, according to a process known to experts in the field as "continuous mass process". The molten polymer is fed to suitable devices, for example a dynamic mixer or a static mixer, where it is mixed with the additives, for example with the athermanous filler, with the expanding agent and with the flame-retardant system, and it is subsequently passed through the holes of a die to give the expandable beads/granules, object of the present invention.

According to another procedure, the flame-retardant system can be incorporated and mixed in the polymeric composition between step (iv) and (v) of the continuous mass process previously described.

The granules (or beads) of the polymeric composition can be re-baked at a temperature lower than or equal to the glass transition temperature (Tg) or slightly higher, for example the Tg increased by up to 8° C., possibly under pressure. A detailed method for preparing vinyl aromatic polymers in continuous mass, is described in international patent application WO 03/53651.

In general, it is possible to incorporate at least said athermanous additives in a master-batch, based on a vinyl aromatic polymer having an average molecular weight Mw ranging from 50,000 to 250,000, preferably from 70,000 to 200,000, to facilitate their mixing with the polymeric stream and to simplify the plant management. In the master-batch, the content of athermanous filler, comprising said coke, said expanded graphite and possibly said carbon black, ranges from 15 to 60% by weight.

In particular, in the case of polymerization in aqueous suspension, the master-batch in pellets can be dissolved in the vinyl aromatic monomer. In the case of mass polymerization, on the other hand, the master-batch in pellet form can be mixed with the granule or with the polymer in the molten state coming from polymerization in solution.

Even more specifically, in the case of polymerization in continuous mass, the master-batch in pellets can be dissolved in the vinyl aromatic monomer/solvent mixture before this is fed to the polymerization reactor in solution.

At the end of the polymerization, whether it be in suspension or continuous mass, the expandable beads or granules obtained are subjected to pre-treatment which is normally applied to conventional expandable compositions and which essentially consists in:
1. covering the beads or granules with a liquid antistatic agent such as amines, ethoxylated tertiary alkylamines, ethylene oxide/propylene oxide copolymers, etc. Said agent allows the coating to adhere and facilitates the screening of the beads;
2. applying the coating to said beads or granules, said coating essentially consisting of a mixture of mono-, di- and tri-esters of glycerine (or other alcohols) with fatty acids, and metal stearates such as zinc and/or magnesium stearate.

A further object of the present invention relates to a process for the production of expanded extruded sheets of vinyl aromatic polymers which comprises:
a1. mixing a vinyl aromatic polymer in the form of pellets or granules or beads and at least one athermanous filler comprising from 0 to 25% by weight, preferably from 0.05 to 25%, more preferably from 0.5 to 10%, calculated with respect to the polymer, of said coke in particle form with an average particle diameter (size) ranging from 0.5 to 100 µm, preferably from 2 to 20 µm, and a surface area, measured according to ASTM D-3037-89 (BET), ranging from 5 to 200 $m^2/g$, preferably from 8 to 50 $m^2/g$, and from 0.05 to 10% by weight, preferably from 0.5 to 5%, calculated with respect to the polymer, of said expanded graphite in particle form with an average particle diameter ($d_{50}$) ranging from 1 to 30 µm, preferably from 2 to 10 µm, a surface area, measured according to ASTM D-3037-89 (BET), ranging from 5 to 500 $m^2/g$, preferably from 8 to 50 $m^2/g$, and a density preferably ranging from 1.5 to 5 $g/cm^3$.
b1. heating the mixture (a1) to a temperature ranging from 180 to 250° C. so as to obtain a polymeric melt which is subjected to homogenization;
c1. adding at least one expanding agent to the polymeric melt, and possibly said additives, for example said flame-retardant system;
d1. homogenizing the polymeric melt which englobes the expanding agent;
e1. homogeneously cooling the polymer melt (d1) to a temperature not higher than 200° C. and not lower than the Tg of the resulting polymeric composition;
f1. extruding the polymeric melt through a die in order to obtain an expanded polymeric sheet.

According to an embodiment of the process for the production of expanded extruded sheets, which is a further object of the present invention, the athermanous filler of coke added to the vinyl aromatic polymer can comprise up to 5% by weight, calculated with respect to the polymer, for example from 0.01 to 5% by weight, preferably from 0.05 to 4.5%, of carbon black. The carbon black can have an average particle size ($d_{50}$) ranging from 10 to 500 nm and a surface area ranging from 5 to 40 $m^2/g$.

According to an alternative embodiment of the process for the production of expanded extruded sheets, object of the present invention, the vinyl aromatic polymer in pellet form is either totally or partially substituted by the compositions of vinyl aromatic polymers in beads/granules, according to the present invention, described or prepared according to one of the processes described above.

Also in the process for the production of expanded extruded sheets based on vinyl aromatic polymers, said athermanous filler can be used by means of said masterbatch.

More details on processes for the preparation of expanded extruded sheets of vinyl aromatic polymers can be found in International patent application WO 06/128656. Some illustrative and non-limiting examples are provided hereunder for a better understanding of the present invention and for its embodiment.

EXAMPLE 1 (COMPARATIVE)

A mixture is charged into a closed and stirred container, consisting of 150 parts by weight of water, 0.2 parts of sodium pyrophosphate, 100 parts of styrene, 0.25 parts of tert-butylperoxy-2-ethylhexanoate, 0.25 parts of tert-butyl perbenzoate and 2 parts of Calcinated Coke 4023 sold by the company Asbury Graphite Mills Inc. (USA), having a size ($d_{50}$) of about 5 µm, a BET of about 20 $m^2/g$. The mixture is heated under stirring to 90° C.

After about 2 hours at 90° C., 4 parts of a solution of polyvinylpyrrolidone at 10% are added. The mixture is heated to 100° C., still under stirring, for a further 2 hours, 7 parts of a 70/30 mixture of n-pentane and i-pentane are added, the whole mixture is heated for a further 4 hours to 125° C., it is then cooled and the batch is discharged.

The granules of expandable polymer thus produced are subsequently collected and washed with water. The granules are then dried in a warm air flow, 0.02% of a non-ionic surface-active agent is added, consisting of a condensate of ethylene oxide and propylene oxide on a glycerine base, sold by Dow (Voranol CP4755) and they are subsequently screened separating the fraction with a diameter ranging from 1 to 1.5 mm.

This fraction proved to represent 40%, 30% being the fraction between 0.5 and 1 mm, 15% the fraction between 0.2 and 0.5 mm, and 15% the gross fraction, between 1.5 and 3 mm.

0.2% of glyceryl monostearate and 0.1% of zinc stearate are then added to the fraction of 1 to 1.5 mm.

The product is pre-expanded to 17 g/l with vapour at a temperature of 100° C., left to age for 1 day and used for the moulding of blocks (having dimensions of 1040×1030×550 mm).

The blocks were then cut to prepare flat sheets on which the thermal conductivity is measured. The thermal conductivity, measured after 5 days of residence in an oven at 70° C., was 34.5 mW/mK. The thermal conductivity measured on a specimen without an athermanous filler was equal to 40 mW/mK at 17 g/l.

EXAMPLE 2

The same procedure is adopted as in Example 1 with the exception that the coke is substituted with 1 part of expanded graphite of the type ABG1005 produced by the company Superior Graphite. This expanded graphite has a particle size ($d_{50}$) of about 6.5 µm, a surface area (BET) of about 16.5 $m^2/g$ and a density of 2.15 $g/cm^3$.

The sheet obtained has a thermal conductivity of 34 mW/mK.

EXAMPLE 3

A mixture is charged into a closed and stirred container, consisting of 150 parts by weight of water, 0.2 parts of sodium tricalcium phosphate, 100 parts of styrene, 0.25 parts of tert-butylperoxy-2-ethylhexanoate, 0.25 parts of tert-butylperbenzoate, 0.01 parts of sodium metabisulphite, 2 parts of the coke used in comparative example 1 and 1 part of expanded graphite used in Example 2. The mixture is heated under stirring to 90° C.

After about 2 hours at 90° C., the mixture is heated for a further 2 hours to 100° C., 7 parts of a 70/30 mixture of n-pentane and i-pentane are added, the mixture is heated for a further 4 hours to 125° C., it is then cooled and discharged.

The granules of expandable polymer thus produced are processed as in comparative example 1, separating the fraction with a diameter ranging from 1 to 1.5 mm.

This fraction proved to represent 60%, 25% being the fraction from 0.5 to 1 mm, 5% the fraction from 0.2 to 0.5 mm, and 10% the gross fraction, from 1.5 to 3 mm. 0.2% of glyceryl monostearate and 0.1% of zinc stearate are added to the fraction of 1 to 1.5 mm.

The expansion and moulding were effected as described in example 1. The thermal conductivity proved to be 32 mW/mK at 17 g/l.

EXAMPLE 4 (COMPARATIVE)

A mixture is charged into a closed and stirred container, consisting of 150 parts by weight of water, 0.2 parts of sodium tricalcium phosphate, 100 parts of styrene, 0.30 parts of tert-butylperoxy-2-ethylhexanoate, 0.25 parts of tert-butylperbenzoate, 0.01 parts of sodium metabisulphite and 4 parts of the coke used in example 1. The mixture is heated under stirring to 90° C.

After about 2 hours at 90° C., the mixture is heated for a further 2 hours to 100° C., 7 parts of a 70/30 mixture of n-pentane and i-pentane are added, the mixture is heated for a further 4 hours to 125° C., it is then cooled and discharged.

The granules of expandable polymer thus produced are processed as in example 1, separating the fraction with a diameter ranging from 1 to 1.5 mm.

This fraction proved to represent 60%, 25% being the fraction from 0.5 to 1 mm, 5% the fraction from 0.2 to 0.5 mm, and 10% the gross fraction, from 1.5 to 3 mm. 0.2% of glyceryl monostearate and 0.1% of zinc stearate are added to the fraction of 1 to 1.5 mm.

The expansion and moulding were effected as described in example 1. The thermal conductivity proved to be 33 mW/mK at 17 g/l.

EXAMPLE 5 (COMPARATIVE)

Comparative example 4 was repeated substituting the Calcinated Coke 4023 with the type Needle Coke 4727 sold by the company Asbury Graphite Mills Inc. (USA) having a size MT50% of about 6 microns, a BET of about 11 m²/g. The thermal conductivity proved to be 32.5 mW/mK at 17 g/l.

EXAMPLE 6

Comparative example 5 was repeated adding 3% of Needle Coke 4727 and 1% of Graphite ABG1005. The thermal conductivity proved to be 31.2 mW/mK at 17 g/l.

EXAMPLE 7

Example 6 was repeated adding 1.5% of hexabromocyclododecane, Saytex HP900 sold by Albmarle and 0.3% of dicumyl peroxide to make the product fireproof. The fraction of 1 to 1.5 mm is then processed as in Example 1. The sheets are put in an oven at 70° C. for 2 days to remove the residual pentane. Test samples are then collected (9 cm×19 cm×2 cm) for the fire behaviour test according to the regulation DIN 4102. The test samples pass the test. The thermal conductivity remains unvaried.

EXAMPLE 8 (COMPARATIVE)

78 parts of polystyrene N1782 produced by Polimeri Europa; 2 parts of ethylene-bis-stereamide; 20 parts of Calcinated Coke 4023 used in Example 1, are mixed in a twin-screw extruder. The extruded product is used as masterbatch, in the production of the expandable compositions of the present invention illustrated hereunder.

89.8 parts of ethylbenzene, 730.0 parts of styrene, 56.2 parts of α-methylstyrene and 0.2 parts of divinylbenzene are fed to a stirred reactor.

123.8 parts of the master-batch prepared as indicated above are fed into the reactor and dissolved (total: 1,000 parts). The reaction is then carried out at 125° C. with an average residence time of 2 hours. The fluid composition at the outlet is then fed to a second reactor where the reaction is completed at 135° C. with an average residence time of 2 hours.

The resulting composition, which is hereafter referred to as "Composition (A)", having a conversion of 72%, is heated to 240° C. and subsequently fed to the devolatilizer to remove the solvent and residual monomer. It is characterized by a glass transition temperature of 104° C., a melt flow index (MFI 200° C., 5 kg) of 8 g/10', a molecular weight Mw of 200,000 g/mol and a Mw/Mn ratio of 2.8, wherein Mw is the weight average molecular weight and Mn is the number average molecular weight.

Composition (A) is fed, from the devolatilizer, to a heat exchanger to lower its temperature to 170° C.

120.7 parts of polystyrene N2982 produced by Polimeri Europa, 24.2 parts of BR-E 5300 (stabilized hexabromocyclododecane, sold by Chemtura) and 5.1 parts of Perkadox 30® (2,3-dimethyl-2,3-diphenylbutane, sold by Akzo Nobel) for a total of 150 parts, are fed to a second twin-screw extruder. A gear pump increases the feeding pressure of this molten additive to 260 barg. 47 parts of a mixture of n-pentane (75%) and iso-pentane (25%) are then pressurized and injected into the feeding of the additive. The mixing is completed with the use of static mixers, at a temperature of about 190° C. The composition thus obtained is described hereunder as "Composition (B)".

Composition (B) is added to 850 parts of Composition (A) coming from the heat exchanger. The ingredients are then mixed by means of static mixing elements for a calculated average residence time of 7 minutes. The composition is then distributed to the die, where it is extruded through a number of holes having a diameter of 0.5 mm, immediately cooled with a jet of water and cut with a series of rotating knives (according to the method described in U.S. Pat. No. 7,320,585).

The pressure in the granulation chamber is 5 bar and the shear rate is selected so as to obtain granules having an average diameter of 1.2 mm. The water is used as a cooling spray liquid and nitrogen is used as carrier gas.

The resulting granules are dried with a centrifugal drier and then covered with a coating. The coating is prepared by adding to the granules 3 parts of glyceryl monostearate, 1 part of zinc stearate and 0.2 parts of glycerine per 1,000 parts of dried granules. The additives of the coating are mixed with the granulate by means of a continuous screw mixer.

The expansion of the granules and moulding were effected as described in Example 1. The thermal conductivity proved to be 32.0 mW/mK.

Some of the sheets, obtained as described in Example 1, are put in an oven at 70° C. for 2 days. Test samples are then collected (9 cm×19 cm×2 cm) for the fire behaviour test according to the regulation DIN 4102. The test samples pass the test.

EXAMPLE 9

88 parts of polystyrene N1782; 2 parts of ethylene-bis-stereamide and 10 parts of expanded Graphite ABG1005 are mixed in a twin-screw extruder. The extruded product, hereafter referred to as "Composition C", is used as masterbatch, in the production of the expandable compositions of the present invention.

89.8 parts of ethylbenzene, 853.8 parts of styrene, 56.4 parts of α-methylstyrene (total: 1,000 parts) are fed to a stirred reactor.

The reaction is carried out at 125° C. with an average residence time of 2 hours. The outgoing fluid composition is then fed to a second reactor where the reaction is completed at 135° C. with an average residence time of 2 hours.

The resulting composition, hereafter referred to as "Composition D", having a conversion of 72%, is heated to 240° C. and subsequently fed to the devolatilizer to remove the solvent and residual monomer. The composition is fed, from the devolatilizer, to a heat exchanger to lower its temperature to 170° C.

154.0 parts of polystyrene N2982, 24.2 parts of BR-E 5300 (stabilized hexabromocyclododecane, sold by Chemtura), 5.1 parts of Perkadox 30® (2,3-dimethyl-2,3-diphenylbutane, sold by Akzo Nobel) and 100 parts of composition C indicated above, for a total of 283.3 parts, are fed to a second twin-screw extruder. A gear pump increases the feeding pressure of this molten additive to 260 barg. 47 parts of a mixture of n-pentane (75%) and iso-pentane (25%) are then pressurized and injected into the feeding of the additive. The mixing is completed with static mixers, at a temperature of about 190° C.

The composition thus mixed is added to 716.7 parts of Composition (D) coming from the heat exchanger. The ingredients are then mixed by means of static mixing elements for a calculated average residence time of 7 minutes. The composition is then distributed to the die, where it is extruded through a number of holes having a diameter of 0.7 mm, immediately cooled with a jet of water and cut with a series of rotating knives as in Comparative Example 8, so as, however, to obtain granules having an average diameter of 1.4 mm.

The resulting granules are dried with a centrifugal drier and then covered with a coating, as described in Comparative Example 8.

The expansion of the granules and moulding were effected as described in Example 1. The thermal conductivity proved to be 32.2 mW/mK.

Some of the sheets, obtained as described in Example 1, are put in an oven at 70° C. for 2 days. Test samples are then collected (9 cm×19 cm×2 cm) for the fire behaviour test according to the regulation DIN 4102. The test samples pass the test.

EXAMPLE 10

71.33 parts of polystyrene N1782 produced by Polimeri Europa; 2 parts of ethylene-bis-stereamide; 20 parts of Calcinated Coke 4023; 6.67 parts of graphite ABG1005 were mixed in a twin-screw extruder using the same operating procedures of comparative Example 8 in both the preparation of this masterbatch and in all the other phases as far as the final granule which, expanded and moulded at 17 g/l, showed a thermal conductivity of 31.2 mW/mK.

EXAMPLE 11

A mixture (A) consisting of 97 parts by weight of polystyrene N1782 and 2 parts of Calcinated Coke 4023 and 1 part of expanded graphite of Example 1 is fed in continuous to a system of two extruders in series.

The temperature inside the first extruder is 220° C. to allow the polystyrene to melt and mix it with the additives. 2 parts of ethyl alcohol and 4 parts of carbon dioxide as expanding agent, with respect to 100 parts of the mixture (A) are fed to the mixture thus obtained.

The polymeric melt comprising the expansion system is homogenized and cooled to 120° C. and extruded through a die having a rectangular transversal section and dimensions of 300 mm×1.5 mm.

A continuous sheet having a thickness of 120 mm is obtained. The density of the sheet is 35 g/l, the average size of the cells (substantially spherical) inside the sheet is about 500 μm. The thermal conductivity proved to be 33 mW/mK.

EXAMPLE 11 (COMPARATIVE)

The same procedure is repeated as in Example 11 with the exception that no athermanous agent is incorporated.

The sheet obtained has a density of 35 g/l and an average size of the cells inside the sheet again of about 500 μm. The thermal conductivity proved to be 38 mW/mK.

The invention claimed is:

1. An expandable vinyl aromatic polymer composition comprising:
    a) a polymeric matrix (a) prepared by polymerizing a base comprising 50-100% by weight of a vinyl aromatic monomer and 0-50% by weight of a copolymerisable monomer;
    b) 1-10% by weight, calculated on polymer matrix (a), of an expanding agent embedded in the polymeric matrix; and
    an athermanous filler comprising:
    c) 0.5-25% by weight, calculated on polymer matrix (a), of particulate carbon coke with a mean particle diameter ($d_{50}$) (size) of from 0.5 to 100 μm, and a surface area, measured according to ASTM D-3037-89 (BET), of from 5 to 200 $m^2/g$, said particulate carbon coke being selected from calcined coke and needle coke; and
    d) 0.5-10% by weight, calculated on polymer matrix (a), of particulate expanded graphite with a mean particle diameter ($d_{50}$) (size) of from 1 to 30 gm and a surface area, measured according to ASTM D-3037-89 (BET) of from 5 to 500 $m^2/g$,
    wherein the athermanous filler is embedded in the polymeric matrix.

2. The composition according to claim 1, wherein the athermanous filler comprises up to 5% by weight, calculated on polymer matrix (a), of carbon black.

3. The composition according to claim 2, wherein the carbon black has a mean particle size ($d_{50}$) of from 10 to 500 nm and a surface area of from 5 to 40 $m^2/g$.

4. The composition according to claim 1, further comprising from 0.1 to 8% by weight, with respect to polymer matrix (a), of a brominated self-extinguishing additive and from 0.05 to 2% by weight, based on polymer matrix (a), of a synergist comprising a labile C—C or O—O bond.

5. An expanded article obtained with the expandable vinyl aromatic polymer composition according to claim 1 having a density of from 5 to 50 g/l and a thermal conductivity of from 25 to 50 mW/mK.

6. An extruded expanded sheet of a vinyl aromatic polymer comprising a cellular matrix of a vinyl aromatic polymer (a) having a density of from 10 to 200 g/l, a mean cell size of from 0.01 to 1.00 mm and comprising an athermanous filler comprising:
   a) 0.5-25% by weight, calculated on cellular matrix (a), of particulate carbon coke with a mean particle diameter ($d_{50}$) (size) of from 0.5 to 100 μm, and a surface area, measured according to ASTM D-3037-89 (BET), of from 5 to 200 $m^2$/g, said particulate carbon coke being selected from calcined coke and needle coke; and
   b) 0.5-10% by weight, calculated on cellular matrix (a), of particulate expanded graphite with a mean particle diameter ($d_{50}$) (size) of from 1 to 30 μm and a surface area, measured according to ASTM D-3037-89 (BET) of from 5 to 500 m2/g.

7. The extruded sheet according to claim 6, wherein the athermanous filler comprises up to 5% by weight, calculated on the polymer, of the carbon black.

8. A process for preparing the expandable vinyl aromatic polymer composition, in the form of beads or granules, according to claim 1, the process comprising polymerizing in an aqueous suspension a vinyl aromatic monomer, optionally together with a polymerisable comonomer in an amount up to 50% by weight, in the presence of the athermanous filler comprising the particulate coke with a mean particle diameter (size) of from 0.5 to 100 μm and a surface area, measured according to ASTM D-3037-89 (BET), of from 5 to 200 $m^2$/g and the expanded particulate-form graphite with a mean particle diameter ($d_{50}$) (size) of from 1 to 30 μm, and a surface area, measured according to ASTM D-3037-89 (BET), of from 5 to 500 $m^2$/g and at least in the presence of a peroxide radical initiator and an expanding agent added before, during or at the end of the polymerizing.

9. The process according to claim 8, wherein the athermanous filler further comprises up to 5% by weight, calculated on the polymer, of the carbon black.

10. The process according to claim 8, wherein a viscosity of a reacting solution of vinyl aromatic monomers, to be suspended in water, is increased by prepolymerizing the monomer, or monomer mixture in bulk, until a polymer concentration of from 1 to 30% by weight is obtained.

11. The process according to claim 8, wherein at the end of the polymerizing, expandable polymer beads or granules having a mean diameter of from 0.2 to 3 mm are obtained, and the athermanous filler is homogenously dispersed therein.

12. A process for preparing through continuous bulk polymerization the expandable vinyl aromatic polymer composition, as beads or granules, according to claim 1, the process comprising:
   mixing a vinyl aromatic polymer in granules or in powder form or already in a molten state, with a mean molecular weight MW of from 50.000 to 250.000, with the athermanous filler comprising the particulate coke, with a mean particle diameter ($d_{50}$) of from 0.5 to 100 μm and a surface area, measured according to ASTM D-3037-89 (BET), of from 5 to 200 $m^2$/g and the expanded particulate-form graphite with a mean particle diameter ($d_{50}$) (size) of from 1 to 30 μm, and a surface area, measured according to ASTM D-3037-89 (BET), of from 5 to 500 $m^2$/g and with possible further additives;
   ii. optionally, if it is not already in the molten state, bringing the polymer mixture to a temperature higher than a melting point of the vinyl aromatic polymer;
   iii. incorporating the expanding agent and optionally other additives, in the molten polymer;
   iv. mixing the polymer composition thus obtained by means of static or dynamic mixing elements; and
   v. granulating the composition thus obtained in a device comprising a die, a cutting chamber and a cutting system.

13. The process according to claim 12, wherein at the end of the granulating, expandable polymer beads or granules with a mean diameter of from 0.2 to 3 mm are obtained, and the athermanous filler is homogenously dispersed therein.

14. The process according to claim 8, comprising incorporating at least the athermanous additive in a master-batch, based on a vinyl aromatic polymer of average molecular weight of from 50.000 to 250.000.

15. A process for producing the extruded expanded vinyl aromatic polymer sheet according to claim 6, the process comprising:
   a1. mixing a vinyl aromatic polymer in pellet form and an athermanous filler comprising of from 0.5 to 25% by weight, calculated on the polymer, of the particulate coke with a mean particle diameter ($d_{50}$) (size) of from 0.5 to 100 μm and a surface area, measured according to ASTM D-3037-89 (BET), of from 5 to 200 $m^2$/g and of from 0.5 to 10% by weight, calculated on the polymer, of the expanded particulate-form graphite with a mean particle diameter ($d_{50}$) (size) of from 1 to 30 μm, and a surface area, measured according to ASTM D-3037-89 (BET), of from 5 to 500 $m^2$/g;
   b1. heating mixture (a1) to a temperature of from 180 to 250° C. so as to obtain a polymeric melt, which is subjected to homogenization;
   c1. adding at least an expanding agent and optionally the additives, to the polymeric melt;
   d1. homogenizing the polymeric melt by incorporating the expanding agent;
   e1. homogenously cooling down the polymeric melt (d1) to a temperature not exceeding 200° C. and not below Tg of a resulting polymer composition; and
   f1. extruding the polymeric melt through a die to obtain a polymer expanded sheet.

16. The process according to claim 15, wherein the athermanous filler added to the vinyl aromatic polymer comprises up to 5% by weight, calculated on the polymer, of the carbon black.

17. The process according to claim 15, wherein the pellet vinyl aromatic polymer is substituted, totally or partially, by the vinyl aromatic polymer compositions, in the form of beads or granules.

18. The process according to claim 15, wherein the pellets of vinyl aromatic polymer are substituted, totally or partially, by vinyl aromatic polymers in which the athermanous filler has been dispersed as either master or as derivatives from post-consumption products.

* * * * *